3,532,627
REDUCTION IN THE IRON CONTENT OF
STABILIZED ZIRCONIA
Stephan P. Mitoff, Elnora, and William H. Stoddard, Jr., Schenectady, N.Y., assignors to General Electric Company, a corporation of New York
No Drawing. Filed Dec. 1, 1966, Ser. No. 598,173
Int. Cl. H01m 27/16
U.S. Cl. 252—62.2                              2 Claims

ABSTRACT OF THE DISCLOSURE

Iron is removed from an iron-containing body of solid oxygen-ion material by heating the body in an atmosphere comprising the combination of a reducing gas and a source of oxygen partial pressure, whereby iron ions are reduced to metallic ions at the surface of, rather than within, the body, after which the metallic iron is evaporated.

---

In U.S. application S.N. 412,158, Mitoff, filed Nov. 18, 1964 and assigned to the assignee of this application, the densification of a solid oxygen-ion electrolyte material by the incorporation therein of from 0.5 to 10.5 weight percent of iron oxide is disclosed for the purpose of minimizing gas penetration into the solid electrolyte. The invention described therein and incorporated herein by reference adequately performs the function of reducing gas permeability, however, the iron oxide remains in the solid electrolyte and for some purposes the presence of iron ions in oxygen-ion electrolyte materials is undesirable. By way of example, stabilized zicronia bodies impregnated with iron oxide will, when coated with lithium doped nickel oxide, form a poorly conducting ferrite phase at high temperature, thereby reducing the efficiency of the composite structure as part of a fuel cell structure.

The most common solid oxygen-ion electrolyte materials are stabilized zirconia and doped thoria. Solid stabilized zirconia is a compound with a cubic crystal structure consisting of zirconia to which is added calcium oxide, yttrium oxide, scandium oxide, rare earth oxides, or mixtures of these oxides. For example, the solid zirconia material for the preparation of an electrolyte may be stabilized with 11 molecular percent calcium oxide. Other stabilized zirconias, which may also be employed in the solid stabilized zirconia electrolyte, are discussed in "Oxide Ceramics" by Ryshkewitch, Academic Press, 1960, particularly on pages 354, 364 and 376 thereof.

Solid doped thoria consists of thoria to which is added calcium oxide, yttrium oxide, or a mixture of rare earth oxides. For example, the solid doped thoria material may consist of thoria which is doped with the addition of four molecular percent calcium oxide to increase its conductivity.

It has been discovered that by heating an iron-containing body of solid oxygen-ion electrolyte material in a preselected reducing environment the iron content can be reduced by a substantial amount. Thus, a segment of yttrium oxide-stabilized zirconia tubing (⅜ inch in diameter and having a 20 mil thick wall) which initially contained 2.53 weight percent of iron, was heated for about 60 hours at about 1350° C. in a flowing atmosphere (at atmospheric pressure) composed of a mixture containing hydrogen and water vapor with the balance of the mixture consisting of nitrogen (a gas consisting of 90 percent nitrogen and 10 percent hydrogen plus sufficient water vapor to create a partial pressure of about 2 cm. of mercury). This combination of a reducing gas and a source of oxygen partial pressure prevents too severe action by the reducing component. A similar effect could be achieved by the use of a carbon monoxide-carbon dioxide mixture. In the example described, the iron content of the stabilized zirconia tubing was reduced to 1.37 weight percent of iron, there was no diminution of the densification of the zirconia and the structural integrity of the zirconia tubing was unaffected.

In another example, a stabilized zirconia body having 5 weight percent iron oxide content was fired for about 4 hours at about 1600° C. in dry hydrogen. Unlike the former example, the zirconia body in this case was found to have several cracks extending therethrough completely destroying the structural integrity thereof.

It was thus determined that the critical aspect of the iron removal is that the reduction of the iron oxide must occur at the surface of the zirconia body. If the reducing conditions are such that this behavior occurs, a gradient in iron oxide content is established between the iron oxide content in the body and the iron oxide content at the surface. As iron is continually removed as a vapor from the surface, a gradual migration of iron oxide takes place from within the body in order to replenish the iron oxide being removed from the surface as vaporized iron. This migration of the iron oxide through the zirconia body actually occurs through the grains of zirconia and is a dissolution process, because iron oxide will dissolve in the zirconia to the extent of about 7 weight percent. The migration of iron oxide to the surface will continue until some minimum gradient in iron content in the body is established.

Control over the severity of the reduction process is accomplished by proper establishment of the partial pressure of oxygen in the atmosphere in which the heating occurs. The maximum partial pressure of oxygen permissible is that at which reduction of the iron oxide will not occur regardless of the presence of the reducing atmosphere and the minimum partial pressure of oxygen permissible is that below which the iron oxide will be reduced to iron within the body of the zirconia rather than at the surface. Reduction of the iron oxide within the zirconia body causes overstressing of the zirconia body and cracking thereof as is indicated in the second example described hereinabove.

Although the description herein has been directed toward the reduction of iron content of densified solid stabilized zirconia, other solid oxygen-ion electrolyte materials (other stabilized zirconias and doped thoria) may also be treated in this fashion.

The amount of time necessary for effective reduction of the iron content is not critical and may be changed by establishing an oxygen pressure close to, but above, the minimum required for the system and employing a higher temperature. In this way, the requisite time can be reduced for any given thickness of material having a particular iron content. After removal of the material from the furnace, cooling thereof and analysis thereof, the process may be repeated if the iron content has not yet been reduced to the extent desired. The maximum oxygen partial pressure for the system may be selected by reference to the text "Physical Chemistry of Metals" by Darken and Gurry (McGraw-Hill 1953) on page 349 thereof. The curve for FeO oxygen partial pressure provides an indication of the gas composition ($H_2/H_2O$ vapor or $CO/CO_2$) required. Thus, the maximum amount of $H_2O$ or $CO_2$ would be obtained at a given temperature, which should be in excess of about 1250° C. Routine experimentation will establish the minimum oxygen partial pressure for a given system and temperature. The experimentation requires only the running of a test sample under the proposed conditions to see whether the sample remains intact. If the sample cracks, either the amount of oxidizing component could be increased and another test made at the same temperature or another test could be made at a reduced temperature. The proper operating conditions (temperature and gaseous atmosphere) should be established satisfactorily in several trials. With these operating conditions a certain oxygen partial pressure will exist and as additional oxygen is formed by reducing the FeO this is taken up by the reducing component of the gas thereby providing a controlled and relatively unvarying atmosphere in terms of oxygen partial pressure.

Most important, of course, in addition to the fact that the iron content of the solid oxygen-ion electrolyte material is reduced by the practice of this invention, no diminution of the densification of this material occurs, in fact, the densification may actually be increased. The iron content of the solid electrolyte material so treated, will always be greater than zero, of course, since the iron removal process depends upon the creation of a gradient at all times in the iron oxide content, however, the considerable reduction in iron content greatly increases the applications for materials so treated.

Accelerated removal of iron can be accomplished by the addition of a halogen gas to the gaseous atmosphere disclosed herein. In this manner the iron is converted to iron halide, any of which are more volatile than iron itself. The use of halogen gases is not as convenient as the gaseous atmospheres proposed, but if desired, a flowing atmosphere composed completely of a halogen gas or a mixture of halogen gases may be employed for the iron removal.

What we claim as new and desired to secure by Letters Patent of the United States is:

1. In the preparation of a densified solid oxygen-ion material selected from the group consisting of stabilized zirconia and doped thoria wherein iron oxide has been introduced into at least some portion of the body to accomplish the densification, the improvement comprising
heating the body to a temperature of at least about 1250° C. in a flowing gaseous reducing atmosphere for a period of time long enough to reduce the iron content to an acceptable level,
said reducing atmosphere having a partial pressure of oxygen therein, the value of which partial pressure is at least high enough so that ferrous oxide migrating from within said body toward the surface thereof will be reduced to iron only at said surface.

2. The improvement as recited in claim 1 wherein the flowing gaseous reducing atmosphere contains a halogen gas admixed therewith.

References Cited
UNITED STATES PATENTS 3,168,482  2/1965  Anderson et al. _____ 252—411 X
3,206,413  9/1965  Leopard _____ 252—411

HELEN M. McCARTHY, Primary Examiner

J. COOPER, Assistant Examiner

U.S. Cl. X.R.

23—21, 140, 345; 252—301.1, 520, 521